United States Patent [19]
Bogusz

[11] 3,762,214
[45] Oct. 2, 1973

[54] SYSTEM FOR MONITORING CONTAMINANTS IN LIQUIDS

[76] Inventor: Frank J. Bogusz, 3E Earls Court, Farmington, Conn. 06032

[22] Filed: May 21, 1971

[21] Appl. No.: 145,820

[52] U.S. Cl. .............................. 73/61 R, 73/170 A
[51] Int. Cl. ...................... G01n 27/00, G01n 33/18
[58] Field of Search ...................... 73/61 R, 61.1 R, 73/53, 170 A; 134/1

[56] References Cited
UNITED STATES PATENTS

| | | | |
|---|---|---|---|
| 3,217,543 | 11/1965 | Van Haagen | 73/359 X |
| 3,214,964 | 11/1965 | Davis | 73/61 R X |
| 3,250,118 | 5/1966 | Johnson, Jr. | 73/53 |
| 3,442,705 | 5/1969 | Wheatley | 134/1 |

*Primary Examiner*—James J. Gill
*Assistant Examiner*—Joseph W. Roskos

[57] ABSTRACT

There is provided a water pollution monitoring system which may be coupled with data handling and processing equipment while the water pollution monitoring system is functioning. Varying levels of pollutents are detented by means of a variety of sensors and an electrical signal corresponding to the pollutant level is processed for recording and/or transmission. Means are provided for automatic periodic cleaning of the sensors so that a high level of accuracy can be maintained for an extended period of time. Additional means are provided for data reduction within the system to reduce massive volumes of detected information to that which is specifically of interest to the equipment operator. Still further means are provided for controlled suspension of the system in aqueous media to maximize system operation.

6 Claims, 4 Drawing Figures

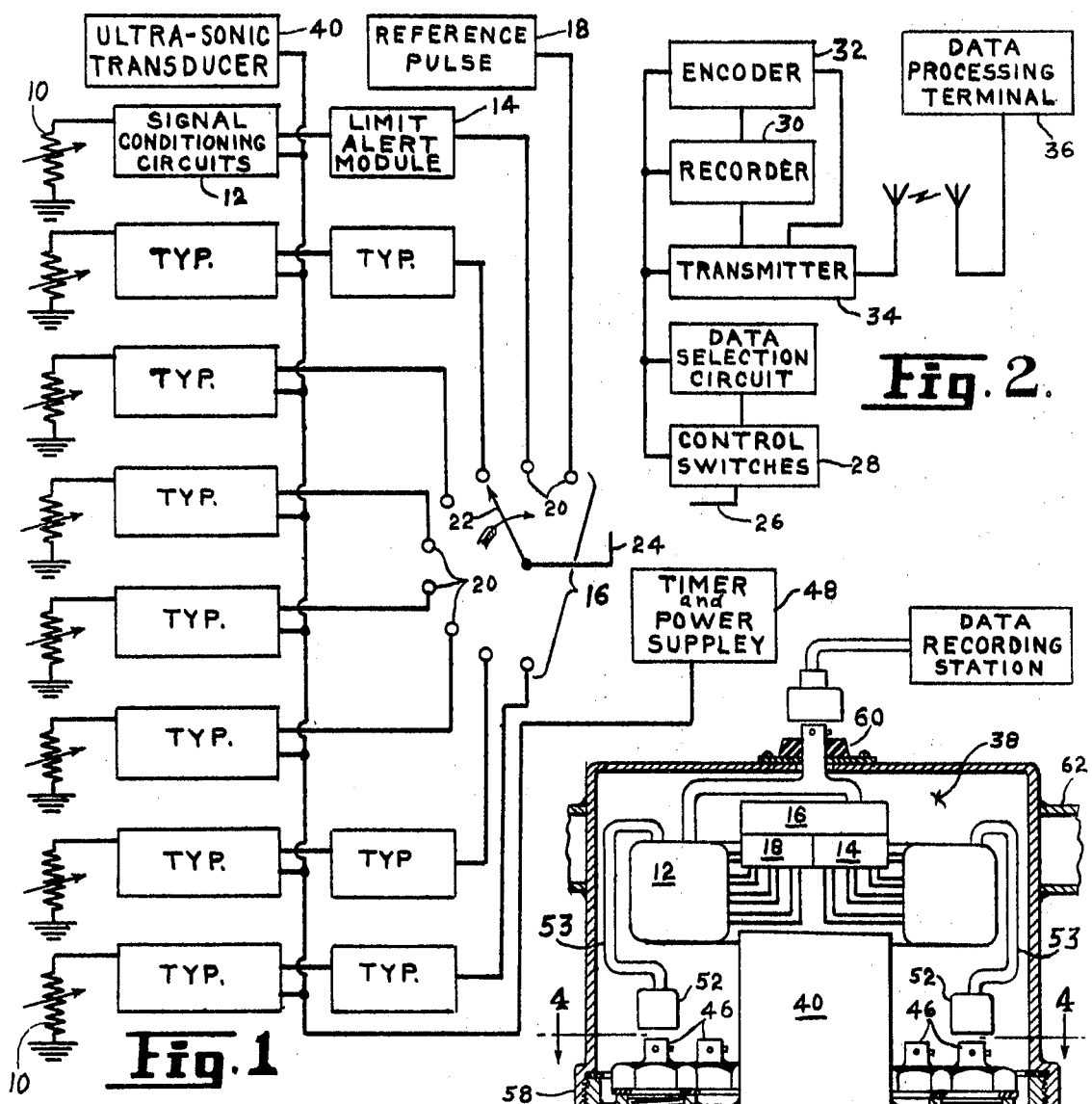
Fig. 1
Fig. 2
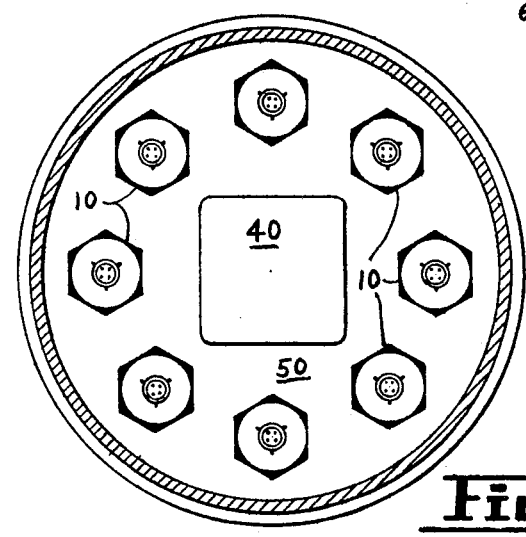
Fig 4
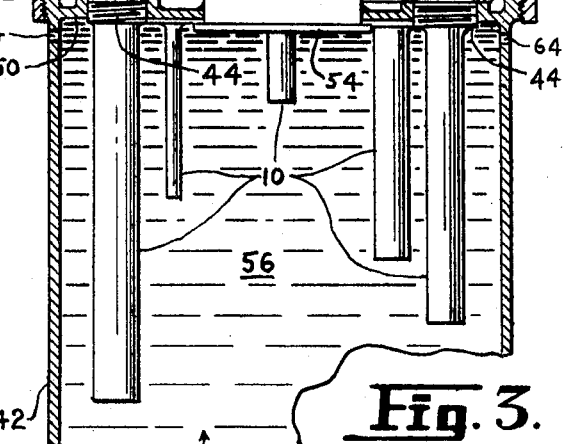
Fig. 3
INVENTOR
Frank J. Bogusz

SYSTEM FOR MONITORING CONTAMINANTS IN LIQUIDS

This invention relates to a system for monitoring contaminant levels in liquids such as water.

More particularly, this invention relates to a combination of sensors, signal conditioning, data handling and automated cleaning equipment, assembled as a unit.

In the measurement and long term monitoring of polutants in aqueous properties, it is necessary that a number of different sensors be provided which can sense the levels of different contaminants present. Data from these sensors are recorded and stored for subsequent review by, for example, scientists responsible for pollution control. In order that the sensor data be accurate, it is necessary that the sensors be frequently cleaned. This presents a costly problem in that contamination of the sensors due to accumulation of deposits on the sensors-detection surface can occur in a matter of mintues. These accumulations of contaminants, if not removed, can cause reading errors on the order of several hundred percent making the data useless. Present equipment requires frequent cleaning of the sensors using cloths, detergents and other conventional means to provide acceptable data accuracy. Also, removal of sensors for cleaning as well as handling and disassembly of the station equipment often results in costly damage to delicate sensing membranes and diaphragms.

With the advent of a marked increase of interest in ecology and pollution abatement, it is anticipated that both government and industry will greatly expand their programs for monitoring contaminant discharges in the nations waterways. It is likely that thousands of monitoring stations will be added in the lakes, rivers, estuaries, canals and off the continental shelf. The high manpower to data ratio presently required will be impractical when this monitoring task is greatly expanded. It will be desirable to have equipment capable of long term maintenance-free monitoring that produces high accuracy data, and does not deluge the data processing center with masses of data that is of little interest. Also, it is desirable to have a system which is self stabilizing so as to provide for relatively constant conditions during data acquisition.

An example of present art are equipments currently in use for monitoring pollutants in a major east coast harbor. One monitoring station located on the shoreline requires that water from the harbor be routed by means of pipes into a reservoir associated with the monitoring equipment and then routed back out into the harbor. Personnel must frequently visit this equipment to perform the cleaning function, and the data obtained is highly questionable due to the unnatural means of obtaining water samples.

This invention obviates the disadvantages of the prior art in that a complement of sensors are located within a housing in relation to an ultrasonic cleaning compartment. A timer and power supply connected to the ultrasonic transducer provides for periodic automatic excitation of the transducer thereby, in conjunction with the surrounding liquid media, effects ultrasonic cleaning of the sensors. Since the art of ultrasonic cleaners is well known, details regarding the cavitation action which results in cleaning is not covered herein. It is clear, by adjusting the power-supply timer's on-off duty cycle to correspond to the level and type of contaminant, the sensors detection apparatus can be maintained at a high level of cleanliness and hence accuracy.

Detected data that fall within acceptable limits or standards are processed through electrical circuitry which may inhibit or allow passage depending on the preset signal level. This provides flexibility for the operator to incorporate, or not incorporate, this feature of the system which is referred to herein as limit alert. With the limited alert feature so adjusted to prevent passage of data until a specific level is reached, the effect is to provide the function data reduction. The limit alert module provides adjustment for data level handling so as to accomodate changes in acceptable water quality standards. Various electronic circuit means may be used to accomplish this data-inhibit or pass functions. Techniques such as the use of zenor diodes, gate circuits, potentiometers, and others, which are well known to the electronic community, can accomplish this function. It is one purpose of this invention to employ such a limit alert module function in relation to the system for monitoring aqueous properties.

Another purpose of this invention is to utilize a float in connection with the system for monitoring aqueous properties. It is noted that float materials and forms are made in infinite varities which are well known and do not require detailed definition herein. The float is merely intended to provide sufficient buoyancy to allow controlled submergence of the sensors and ultrasonic cleaning compartment into the media being monitored. This float may be variable in size and shape and in its method of mount to the monitoring system.

A variety of signal conditioning circuits as well as the limit alert module, data sampling means and ultrasonic transducer are located within a water-tight compartment of the systems container. The data sampling sequencer may be switched into the data acquisition channels to systematically sequentially sample the various perameters of the media being monitored. A reference pulse is provided to allow data analyst to determine and correlate the data with respect to the various sensors. Sample rate of the data-sampling sequencer may be made adjustable by varying the rate of rotation of switch contact means. Module construction and assembly is preferrably employed as well as standardization of electrical connection to allow for flexibility in including or not including various assemblies of the system. For example, it may be desirous in a specific situation to have complete raw data for scientific review rather than sampled data as provided by the sample sequencer. Or, it may be desirous in specific situations to look at all levels of one or more of the media contaminants by routing the data so as to bypass the limit alert module. Further, it may be desirous to interchange sensors to provide specific information for scientific purposes in which case it may be necessary to replace the signal conditioning associated with that sensor channel. Modularized construction and standard electrical connection is intended to accomodate this multiplicity of application.

The system is compact, relatively portable, and relatively easily located insitu to provide a highly accurate, maintenance-free data acquisition and monitoring station.

Accordingly, it is the object of this invention to provide an improved system for monitoring aqueous properties.

It is another object of this invention to provide an improved method of data acquisition.

Other object and advantages of this invention will become apparent as this description proceeds, taken in conjunction with the drawings in which;

FIG. 1 is a diagram in block form of the system for monitoring aqueous properties according to this invention.

FIG. 2 is a diagram in block form of the data handling terminal used in relation to this invention.

FIG. 3 is a view in cross section showing a preferred version and approximate compartment locations for assemblies according to this invention, and FIG. 4 is a section view taken along the line 4—4 of FIG. 3 and showing a preferred arrangement for eight sensors and for the ultrasonic transducer.

Referring now to FIG. 1, there is shown a block diagram of the assemblies related according to this invention. Designated as 10 is the systems sensor complement. Each sensor may be different one from the other and of conventional design except for their mounting facility 44 and electrical connector 46 which are all the same and standard. Designated generally as 12 are the signal conditioning circuits selected to receive signals from the sensors and appropriately to act on the signals and prepare them for transmission to the subsequent data processing equipments. The systems-signal-conditioning circuits 12 may be of a wide variety both in form and function. Depending on the selected sensors 10, the signal conditioning 12 may be required to function as amplifiers, bridge circuits, ranging circuits, and possibly others. The limit alert module 14 acts on the sensor output signal in a data reduction manner. In a complement of data acquisition channels it may be desirous that several of the channels incorporate the data reduction feature while at the same time other channels not incorporate the data reduction feature. The data-sampling sequencer 16 samples data at the output of the limit alert modules 14, signal conditioning circuits 12, or in some cases directly at the sensors 10. The data sampling sequencer performs the function of arranging the data into a controlled serial train of electrical impulses whose amplitude corresponds on a one-to-one basis with the level of the various media parameters being monitored. A reference pulse 18 is provided to facilitate data analysis by automatically indexing the sampling start sequence. Other switch contacts 20 are sequentially engaged by rotating switch contact arm 22 and the data therefrom sampled and routed to data-handling station schematically illustrated in FIG. 2 by means of line 24.

Ultrasonic transducer exciter 40 receives its excitation power in a periodically timed manner from the timer and power supply 48. Said timer and power supply 48 may be preferredly located at the data handling terminal FIG. 2, remotely from the equipments schematically set forth in FIG. 1. All power required by sensors 10, signal conditioning circuits 12, limit alert modules 14, data sampling sequencer 16 and reference pulse circuitry 18 may be preferredly obtained from power supply and timer 48.

FIG. 2 is an illustration of a typical data handling terminal which may be used in conjunction with this invention. Line designated as 26 would typically be connected to line 24 thereby providing electrical connection to receive data from the monitor station FIG. 1. Conventional equipment within the data handling terminal may provide for appropriate switching 28 to allow for recording 30, encoding 32, and RF transmission 34 and 36 of these data, and for manual activation of power supply 48.

FIG. 3 is illustrative of a preferred arrangement for the assemblies of this invention as set forth in FIG. 1. Compartment area 38 is water tight and contains all of the assemblies 12, 14, 16, 18 and 40 while compartment 42 is designed to allow the media being monitored to surround sensing surfaces of the system's sensor compliment 10. Standardized mount 44 and electrical connection 46 are provided so as to make convenient replacement and/or substitution by other system sensors 10. Standardized mount 44 allows interchangable installation into mounting bulk head 50 while standard connector 46 allows interchangable engagement with mating connector 52 to route signals via cables 53 to signal conditioning circuits 12. Ultrasonic excitation diaphragm 54 is affixed to bulk head 50 to maintain the water tight condition for compartment 38 while at the same time imparting ultrasonic cleaning energy to the media 56 for cleansing the systems sensors 10 located in compartment 42. Means are provided at 58 and connection at 60 so as to facilitate assembly of the systems components and conveniently achieve a water tight condition for compartment 38. Float 62 is illustrated for informational purpose as are air pocket bleed holes 64 and compartment 42 opening 66.

FIG. 4 is a transverse view taken on 4—4 of FIG. 3. Thereon is illustrated a preferred distribution of the systems sensors 10 and ultrasonic transducer 40 in relation to mounting bulk head 50.

Thus, it can be seen by this invention that a self cleaning water pollution monitoring system is provided which can reduce masses of data at the acquisition site passing on only the significant data for processing.

Having described this invention, it is to be understood that it is to be limited only by the scope of the claims appended hereto.

What is claimed is:

1. A fluid analyzing apparatus for in situ analysis of fluids comprising: a container which is open at one end, a plurality of sensors fixedly mounted within said container for sensing characteristics of said fluid and producing electrical signals, data recording means for receiving said electrical signals from said sensors, means within said container for periodically inducing oscillatory displacement of said fluid thereby cleaning said sensors, means for selective excitation of said means for inducing oscillatory displacement, and means for sequentially switching individual ones of said sensors and said data recording means.

2. The apparatus as defined in claim 1 including means electrically connected between said sensors and said means for sequentially switching for inhibiting passage of said signals to said data recording means when the magnitudes of said signals are outside a preset signal level.

3. The apparatus as defined in claim 1 including air exhaust ports in said container.

4. The apparatus as defined in claim 1 wherein said means for selective excitation includes automatic timers.

5. The apparatus as defined in claim 1 including means attached to said container for providing buoyancy of said container in said fluid.

6. The apparatus as defined in claim 1 wherein said electrical signals received by said data recording means are transmitted by radio frequency to a remote data processing terminal.

* * * * *